(12) United States Patent
Undevik

(10) Patent No.: US 8,109,554 B2
(45) Date of Patent: Feb. 7, 2012

(54) METHOD AND APPARATUS FOR SUPPORTING A WHEELCHAIR IN A VEHICLE

(75) Inventor: Rickard Undevik, Hedemora (SE)

(73) Assignee: Hedemora Anpassning AB, Hedemora (SE)

( * ) Notice: Subject to any disclaimer, the term of this patent is extended or adjusted under 35 U.S.C. 154(b) by 79 days.

(21) Appl. No.: 12/660,346

(22) Filed: Feb. 24, 2010

(65) Prior Publication Data
US 2011/0204688 A1    Aug. 25, 2011

(51) Int. Cl.
*B60N 2/64*    (2006.01)
(52) U.S. Cl. .................................................. 296/65.04
(58) Field of Classification Search ............... 296/65.04, 296/65.06; 297/353, 230.1, 230.11, 230.12, 297/230.13, 230.14
See application file for complete search history.

(56) References Cited

U.S. PATENT DOCUMENTS

| | | | | |
|---|---|---|---|---|
| 4,993,666 A | * | 2/1991 | Baymak et al. | 244/122 R |
| 5,180,181 A | * | 1/1993 | Letechipia | 280/304.1 |
| 5,567,095 A | * | 10/1996 | James et al. | 410/7 |
| 5,746,465 A | * | 5/1998 | Jones et al. | 296/65.03 |
| 7,854,576 B2 | * | 12/2010 | Girardin et al. | 410/9 |

FOREIGN PATENT DOCUMENTS

| | | |
|---|---|---|
| EP | 0 365 377 A1 | 4/1990 |
| EP | 1 777 100 A1 | 4/2007 |
| GB | 2104849 A * | 3/1983 |
| JP | 2009160303 A * | 7/2009 |
| WO | WO 03/008229 A1 * | 1/2003 |

* cited by examiner

*Primary Examiner* — H Gutman
(74) *Attorney, Agent, or Firm* — Mark P. Stone

(57) ABSTRACT

In a vehicle adapted for a driver or passenger in a wheelchair, an additional support (11) for the back of the wheelchair is fastened to an upper portion of a pillar (12, 13), a lower portion of the pillar being fastened to the floor, and the upper portion of the pillar being turnable relative to the lower portion of the pillar and turnably fastened to a bracket of the B-pillar (10) of the vehicle so that the support (11) can be swung into and out of an operative position by the turning the upper portion relative to the lower portion. The upper and lower portions have interacting inner and outer sleeves (24, 19) with grooves (28,21) oriented at an angle to each other. The inner and outer sleeves are interconnected by a through bolt (22) fastened to a device inside the lower portion and arranged to move the bolt along the pillar so that the upper portion (12) of the pillar is turned when the bolt is displaced vertically.

3 Claims, 3 Drawing Sheets

METHOD AND APPARATUS FOR SUPPORTING A WHEELCHAIR IN A VEHICLE

FIELD OF INVENTION

This invention relates to a support for the back of a wheelchaired driver of a motor vehicle that has no driver's seat.

BACKGROUND OF THE INVENTION

Some disabled persons with limited strength are not able to move themselves from a wheelchair to the driver's seat of a vehicle. An alternative is to stay in the wheelchair when driving, but most wheelchairs have a support for the back that is not dimensioned for driving. In order to sit safely in a wheelchair when driving, an additional support can be mounted in the vehicle for the driver and also for a passenger.

SUMMARY OF THE INVENTION

A support (11) for the back of a wheelchair is mounted in the upper portion (12) of a pillar (12, 13) having a lower portion (13) rigidly and nonturnably mounted to the vehicle floor and upper portion (12) journaled in the lower portion and fastened to the B-pillar (10) of a motor vehicle so that the support for the back of the wheelchair can be swung into and out of an operative position in which it engages the back of the wheelchair by the turning of the upper portion of the pillar relative to the lower portion of the pillar.

The upper and lower portions of the pillar have overlapping sleeves (19) and (24) with grooves (21) and (28), respectively, oriented at an angle to each other and are coupled together by a bolt (22) fastened in a device which is arranged to displace the bolt along the pillar (12, 13) so that the upper portion (12) of the pillar is turned when the bolt is displaced.

DESCRIPTION OF THE BEST MODE FOR CARRYING OUT THE INVENTION

Figure 1:
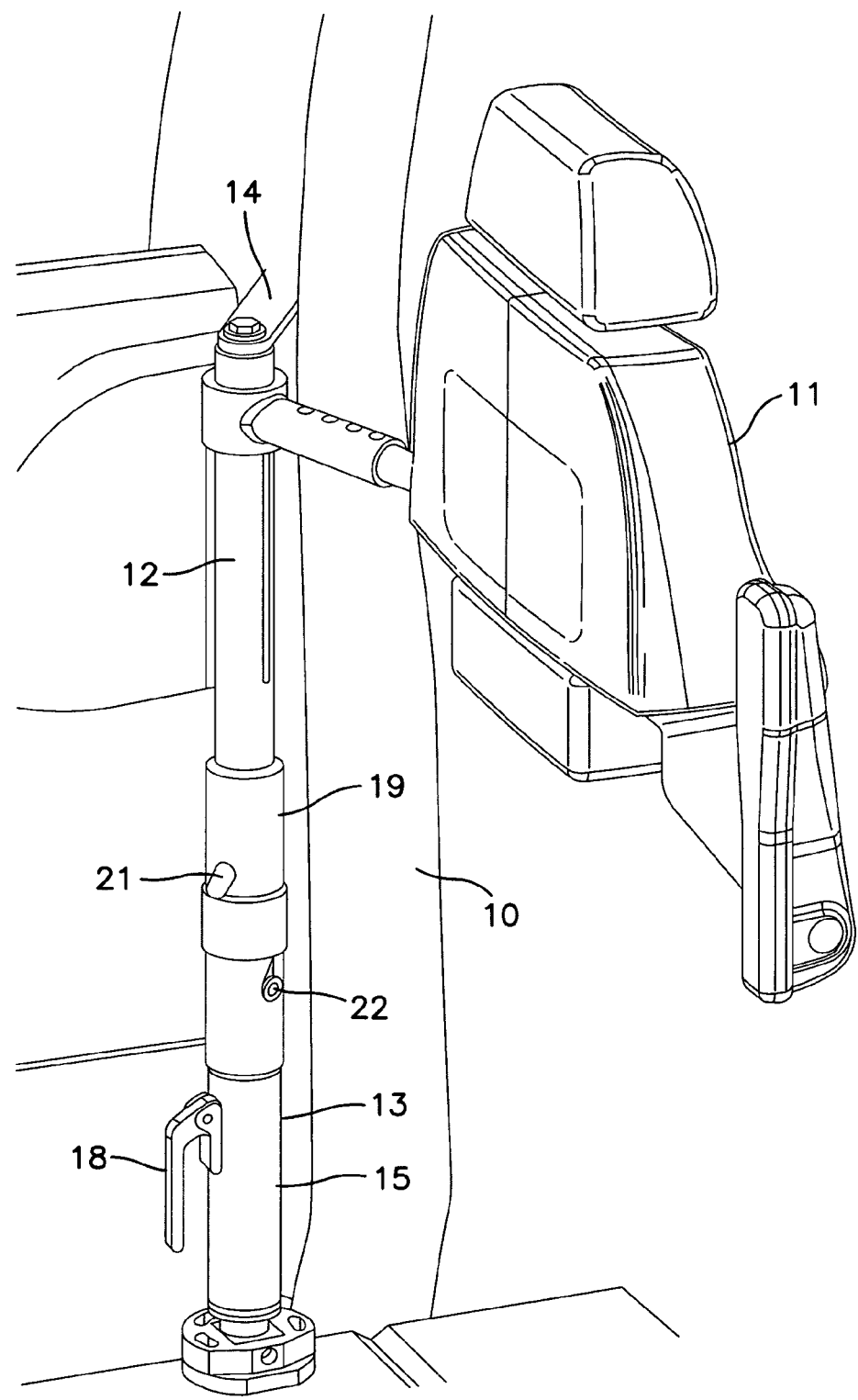
FIG. 1 shows a pillar in accordance with the invention mounted in a vehicle and having its support for the back of a wheelchair in an operative position.
Figure 2:
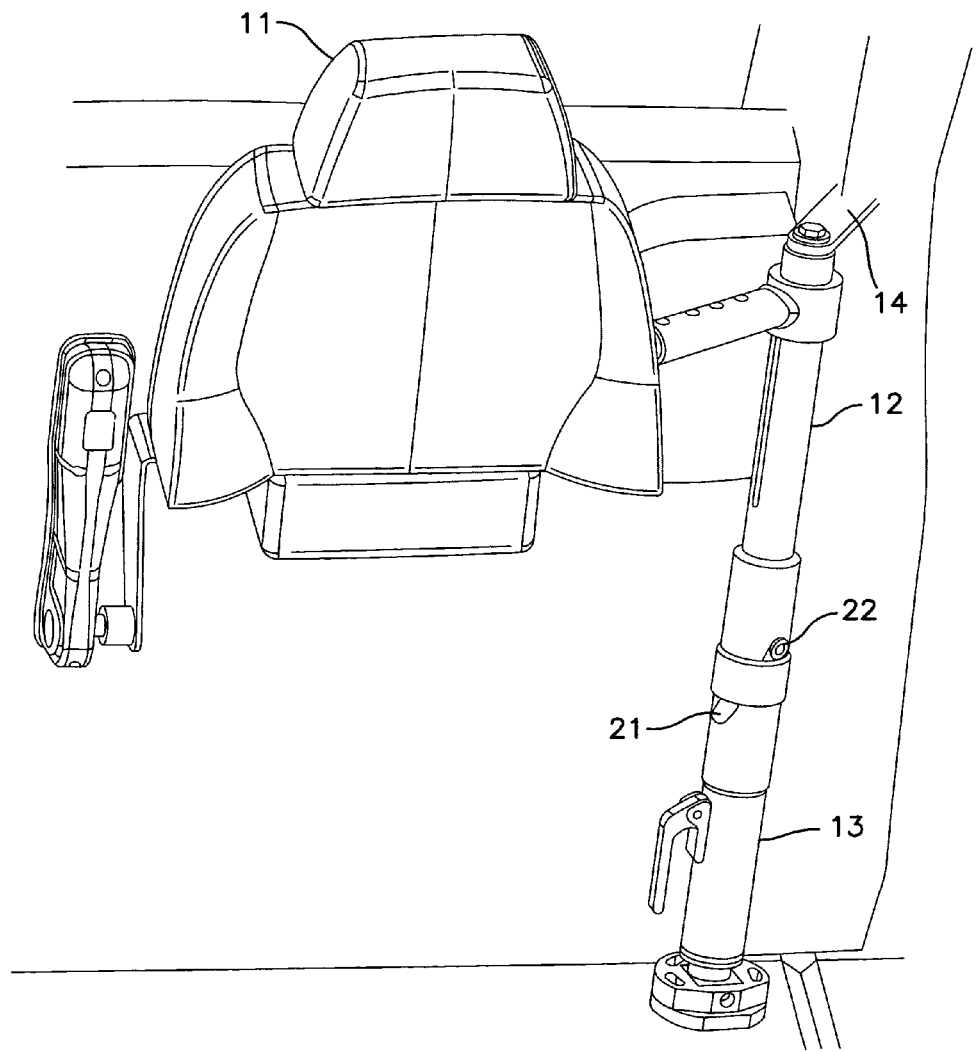
FIG. 2 shows the same pillar illustrated by FIG. 1 with the support for the back of the wheelchair in an inoperative position.

In the figures, a door opening of a vehicle is adapted for a disabled person, in which the driver can drive the vehicle staying in his wheelchair and having an additional support 11 for his back so that he will be as safe as a driver in a normal seat. With the support 11 in its operative position of FIG. 1, the wheelchair with the driver is lifted into the vehicle through the door opening behind the position of the normal driver's seat which has been removed. Then, the support 11 is swung away into its position alongside the door or door opening as shown in FIG. 2 so that the wheelchair can be moved to the driver's position and be locked to the floor by means of a locking device. The support is then swung back to its operative position shown in FIG. 1 so that it will be a complement to the support on the wheelchair by engaging the back of the wheelchair.

The support 11 is mounted on the upper portion 12 of a vertical pillar that has its lower portion 13 fastened in the floor near the B-pillar 10 of the vehicle. The upper portion 12 is turnably journaled in the lower portion 13 and turnably fastened in a bracket 14 of the B-pillar 10. The upper portion 12 of the pillar 12, 13 carries the support 11 and the height of the support can be vertically adjusted. The pillar 12, 13 will not cause an obstruction when the wheelchair is lifted into the vehicle since the pillar is slim and positioned near the B-pillar of the vehicle.

Figure 3:
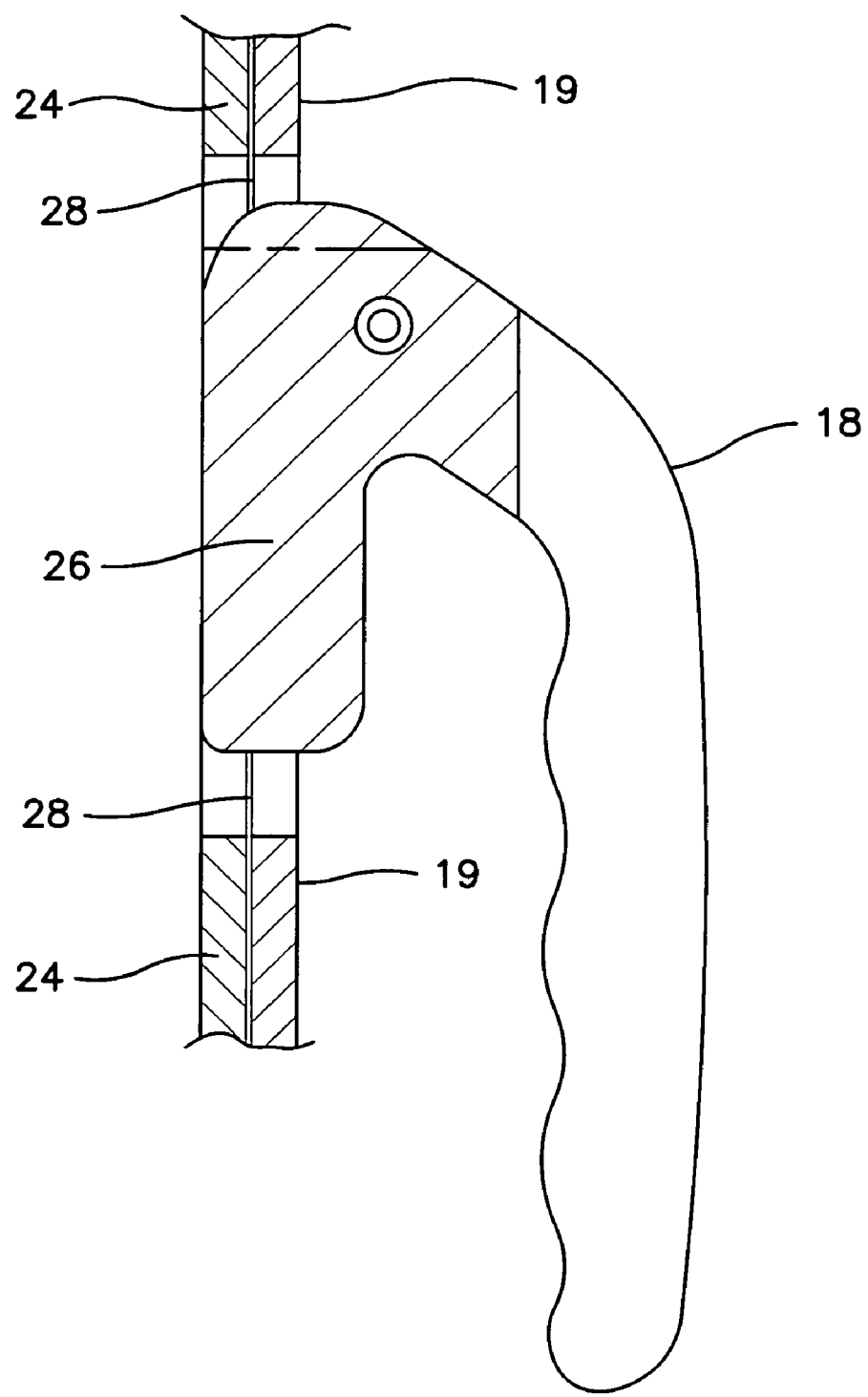
FIG. 3 shows the lower portion of the pillar illustrated by FIGS. 1 and 2, separated from the remaining structure.

The lower part 13 of the pillar 12, 13 comprises a tube 15 that has an inner sleeve designated by reference numeral 24 in FIG. 3. This inner sleeve can be locked to the tube 15 by means of an eccentric key 26 than can be turned into a groove 28 in the inner sleeve 24 by means of a handle 18 (FIG. 3). The upper portion 12 of the pillar is journaled in the lower portion 13 by having an outer sleeve 19 journaled on the inner sleeve 24 of the lower portion 13. The inner sleeve 24 has two longitudinal grooves 28 and the outer sleeve 19 has two screwed grooves 21. The grooves of these two pairs of grooves are thus oriented at an angle to each other, and they are coupled together by means of a through bolt 22 which is fastened to a device mounted in the tube 15. This device is preferably electric and arranged to displace the bolt 22 vertically so as to turn the upper portion 12 of the pillar and the support 11 between its two illustrated positions. This arrangement results in a great step up of the force and will be self locking so that the support 11 will be able to absorb great forces in case of a collision. In case of emergency, the inner sleeve 24 can be free to rotate when the eccentric key is released by means of the handle 18 so that the support 11 can be swung manually.

A similar support structure as for the driver can be mounted on the passenger side of the vehicle.

The invention claimed is:

1. Support for the back of a wheelchaired driver of a vehicle that has no driver's seat and has a door behind the B-Pillar of the vehicle through which the wheelchair with the driver can be lifted into the vehicle, characterised in that
    the support for the back of the wheelchair is mounted to an upper portion of a pillar having an upper and a lower portion, in which the lower portion is rigidly and nonturnably mounted to the vehicle floor and the upper portion is journaled in the lower portion and fastened in the B-pillar of the vehicle so that the support for the back of the wheelchair can be swung into and out of an operative position by turning the upper portion relative to the lower portion,
    wherein the upper and lower portions have overlapping sleeves with grooves oriented at an angle to each other and are coupled together by a bolt fastened in a device which is arranged to displace the bolt along the pillar so that the upper portion of the pillar is turned relative to the lower portion of the pillar when the bolt is displaced.

2. Support according to claim 1, wherein the lower portion of the pillar comprises a tube fastened to the floor, the inner one of the sleeves carries the grooves of the lower portion of the pillar, said device being placed in the tube forming at least part of the lower portion of the pillar,
    the inner one of the sleeves being lockable so as to be unturnable by means of a key mounted on the tube and having a handle by which the key can be swung into a locking groove in the inner sleeve.

3. Support according to claim 1, further including a height adjustment element for adjusting the height of said support.

* * * * *